Patented May 8, 1934

1,957,593

UNITED STATES PATENT OFFICE 1,957,593

MANUFACTURE OF PHTHALOYL-PHENANTHRIDONES

Rudolf M. Heidenreich and Paul Tust, Leverkusen-on-the-Rhine, Germany, assignors to General Aniline Works, Inc., New York, N. Y., a corporation of Delaware No Drawing. Application January 28, 1929, Serial No. 335,739. In Germany February 3, 1928

5 Claims. (Cl. 260—40)

The present invention relates to a process of preparing phthaloyl-phenanthridones and to new products obtainable by this process.

In accordance with the invention phthaloyl-phenanthridones of the probable general formula

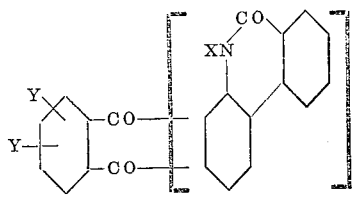

wherein X stands for hydrogen or a hydrocarbon radical, such as methyl, ethyl, benzyl and the like, and the Y's stand for hydrogen or chlorine, are prepared by reacting upon the phenanthridone compound with phthalic acid anhydride or a substitution product thereof, such as 3.6-dichlorophthalic acid anhydride and the like, in the presence of aluminium chloride and at a temperature between about 180–240° C. The reaction is finished, when a sample worked up with diluted hydrochloric acid yields a vat with an alkaline hydrosulfite solution. The reaction mass is then poured into cold water, hydrochloric acid is added, the mixture boiled up, filtered, washed first with diluted hydrochloric acid, then with water until neutral, and dried.

The products thus obtainable form orange yellow to yellow compounds, dyeing cotton from an alkaline hydrosulfite vat yellow shades of good fastness properties.

When phenanthridone and phthalic acid anhydride themselves are used as starting materials, two different compounds are obtained which can be separated, after having been purified by vatting and re-oxidizing, by crystallization from a high boiling organic solvent, such as trichlorobenzene, nitrobenzene and the like. Both of the compounds thus obtainable probably correspond to the formula

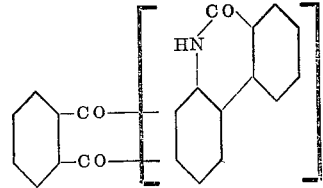

and are believed to be isomeric to one-another.

The following example illustrates our invention without limiting it thereto, the parts being by weight:—

*Example*.—2 to 4 parts of anhydrous aluminium chloride are gradually introduced at about 180° C. into a melt of 3 parts of phthalic acid anhydride and 1 part of phenanthridone, the melt being heated slowly to about 230° C. while stirring. From the dark, finely powdered mass, after repeated boiling with diluted hydrochloric acid, the mixture of the phthaloyl-phenanthridones produced is obtained by vatting and re-oxidizing. The orange-yellow to yellow raw product can be separated, by crystallizing from nitrobenzene or trichlorobenzene, into two isomeric phthaloyl-phenanthridones. One of the two isomeric substances which is more soluble in nitrobenzene or trichlorobenzene forms the main part of the raw product. It dissolves in concentrated sulfuric acid with a reddish-yellow coloration, which is not altered by the addition of paraformaldehyde.

For a substance of the constitution $C_{21}H_{11}O_3N$ the calculated values are 77.5% C, 3.5% H, 4.3% N found by analysis 77.1% C, 3.8% H, 4.4% N. This monophthaloylphenanthridone dyes cotton from a reddish-brown hydrosulfite vat a yellow shade of very satisfactory fastness-properties, especially to light. It is a crystalline orange compound melting at 378–380° C., gives a yellowish brown solution in aqueous alkaline hydrosulfite solution and is insoluble in 80% sulfuric acid, the suspension undergoing no change when boiled.

The isomeric monophthaloyl-phenanthridone being more difficultly soluble in nitrobenzene or trichlorobenzene, dissolves in sulfuric acid with a yellow coloration and dyes cotton a paler yellow. The analysis of this product gives the same values as the above described isomeric substance.

We claim:—

1. Process which comprises reacting upon a phenanthridone of the formula:

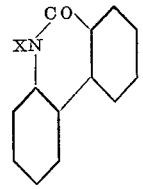

wherein X stands for hydrogen, alkyl or benzyl, with a phthalic acid anhydride of the general formula:

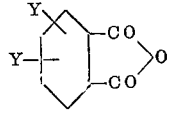

wherein the Y's stand for hydrogen or chlorine, in the presence of aluminium chloride at a temperature between about 180° and 240° C.

2. Process which comprises reacting upon phenanthridone with phthalic acid anhydride of the general formula:

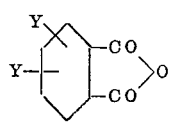

wherein the Y's stand for hydrogen or chlorine, in the presence of aluminium chloride at a temperature between about 180–240° C.

3. Process which comprises reacting upon 1 part by weight of phenanthridone with 3 parts by weight of phthalic acid anhydride in the presence of 2 to 4 parts by weight of anhydrous aluminium chloride at a temperature of about 230° C.

4. The products of the general formula:

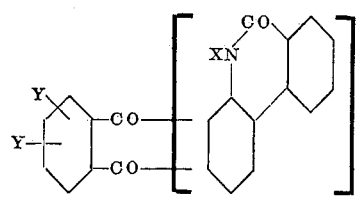

wherein X stands for hydrogen, alkyl or benzyl, and wherein the Y's stand for hydrogen or chlorine, said products being orange-yellow to yellow compounds, dyeing cotton from an alkaline hydrosulfite vat yellow shades of good fastness properties and when both X and the Y's are hydrogen, the product having a melting point of 378–380° C.

5. The product of the formula

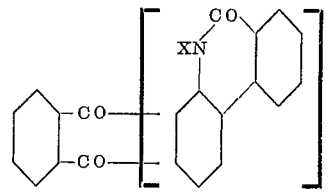

said product being a crystalline orange compound melting at 378–380° C., dissolving in concentrated sulfuric acid with a reddish yellow coloration and dyeing cotton from an alkaline hydrosulfide vat a yellow shade of good fastness properties.

RUDOLF M. HEIDENREICH.
PAUL TUST.